United States Patent
Pickard

(10) Patent No.: US 9,493,107 B2
(45) Date of Patent: Nov. 15, 2016

(54) SOLID STATE LIGHTING DEVICES HAVING REMOTE LUMINESCENT MATERIAL-CONTAINING ELEMENT, AND LIGHTING METHODS

(71) Applicant: CREE, INC., Durham, NC (US)

(72) Inventor: Paul Kenneth Pickard, Morrisville, NC (US)

(73) Assignee: Cree, Inc., Durham, NC (US)

( * ) Notice: Subject to any disclaimer, the term of this patent is extended or adjusted under 35 U.S.C. 154(b) by 470 days.

(21) Appl. No.: 13/672,941

(22) Filed: Nov. 9, 2012

(65) Prior Publication Data

US 2013/0063924 A1    Mar. 14, 2013

Related U.S. Application Data

(63) Continuation of application No. 12/465,203, filed on May 13, 2009, now Pat. No. 8,337,030.

(51) Int. Cl.
*B60Q 1/00* (2006.01)
*F21K 99/00* (2016.01)
(Continued)

(52) U.S. Cl.
CPC ........... *B60Q 1/0052* (2013.01); *B60Q 1/0058* (2013.01); *F21K 9/00* (2013.01); *F21V 9/16* (2013.01); *F21Y 2101/02* (2013.01); *F21Y 2113/02* (2013.01)

(58) Field of Classification Search
CPC ..... B60Q 1/0052; B60Q 1/0058; F21V 9/16; F21K 9/00; F21Y 2101/02; F21Y 2113/02
USPC .......... 362/311.01, 294, 457, 373, 276, 802, 362/800
See application file for complete search history.

(56) References Cited

U.S. PATENT DOCUMENTS

| 4,918,487 A | 4/1990 | Coulter, Jr. |
| 5,813,753 A | 9/1998 | Vriens et al. |

(Continued)

FOREIGN PATENT DOCUMENTS

| DE | 10 2007 041 896 | 3/2009 |
| EP | 1 566 848 | 8/2005 |

(Continued)

OTHER PUBLICATIONS

Zhu et al., "Optimizing the Performance of Remote Phosphor LED," First International Conference on White LEDs and Solid State Lighting, 2007, pp. 1-5.

(Continued)

*Primary Examiner* — Stephen F Husar
*Assistant Examiner* — Danielle Allen
(74) *Attorney, Agent, or Firm* — Burr & Brown, PLLC

(57) ABSTRACT

A lighting device comprising a first group of solid state light emitters, an element containing luminescent material and a second group of solid state light emitters spaced from the element. In some embodiments, (1) at least 50% of light emitted by one of the first group does not mix with light emitted by the second group before the light emitted by the second group has entered the element, (2) at least 90% of exiting light emitted by the second group travels farther within the lighting device than 90% of exiting light emitted by the first group, (3) an average distance traveled by exiting light emitted by the second group is farther than an average distance traveled by exiting light emitted by the second group, and/or (4) light emitted by the first group directly exiting the lighting device exits the lighting device without being incident upon the element.

21 Claims, 3 Drawing Sheets

(51) Int. Cl.
*F21V 9/16* (2006.01)
*F21Y 101/02* (2006.01)
*F21Y 113/02* (2006.01)

(56) References Cited

U.S. PATENT DOCUMENTS

| | | | |
|---|---|---|---|
| 5,838,247 | A | 11/1998 | Bladowski |
| 5,959,316 | A | 9/1999 | Lowery |
| 6,155,699 | A | 12/2000 | Miller et al. |
| 6,234,648 | B1 * | 5/2001 | Borner et al. ............ 362/235 |
| 6,252,254 | B1 | 6/2001 | Soules et al. |
| 6,350,041 | B1 | 2/2002 | Tarsa et al. |
| 6,576,930 | B2 | 6/2003 | Reeh et al. |
| 6,577,073 | B2 | 6/2003 | Shimizu et al. |
| 6,600,175 | B1 | 7/2003 | Baretz et al. |
| 6,635,363 | B1 | 10/2003 | Duclos et al. |
| 6,692,136 | B2 | 2/2004 | Marshall et al. |
| 6,809,347 | B2 | 10/2004 | Tasch et al. |
| 6,841,804 | B1 | 1/2005 | Chen et al. |
| 6,871,982 | B2 | 3/2005 | Holman et al. |
| 6,936,857 | B2 | 8/2005 | Doxsee et al. |
| 6,939,481 | B2 | 9/2005 | Srivastava et al. |
| 6,963,166 | B2 | 11/2005 | Yano et al. |
| 7,029,935 | B2 | 4/2006 | Negley et al. |
| 7,061,454 | B2 | 6/2006 | Sasuga et al. |
| 7,213,940 | B1 | 5/2007 | Van De Ven et al. |
| 7,265,488 | B2 | 9/2007 | Ng et al. |
| 7,325,955 | B2 | 2/2008 | Lucas et al. |
| 7,360,937 | B2 | 4/2008 | Han et al. |
| 7,365,485 | B2 | 4/2008 | Fukasawa et al. |
| 2002/0015013 | A1 | 2/2002 | Ragle |
| 2002/0084748 | A1 | 7/2002 | Ayala et al. |
| 2003/0127660 | A1 | 7/2003 | Bawendi et al. |
| 2004/0012027 | A1 | 1/2004 | Keller et al. |
| 2004/0217364 | A1 | 11/2004 | Tarsa et al. |
| 2005/0057917 | A1 | 3/2005 | Yatsuda et al. |
| 2005/0093430 | A1 | 5/2005 | Ibbetson et al. |
| 2005/0207165 | A1 | 9/2005 | Shimizu et al. |
| 2005/0231953 | A1 | 10/2005 | Reeh et al. |
| 2006/0002141 | A1 | 1/2006 | Ouderkirk et al. |
| 2006/0012298 | A1 | 1/2006 | Lee et al. |
| 2006/0072314 | A1 | 4/2006 | Rains |
| 2006/0105482 | A1 | 5/2006 | Alferink et al. |
| 2007/0115656 | A1 | 5/2007 | Chou et al. |
| 2007/0137074 | A1 | 6/2007 | Van de Ven |
| 2007/0139920 | A1 | 6/2007 | Van de Ven |
| 2007/0159091 | A1 | 7/2007 | Hirosaki et al. |
| 2007/0170447 | A1 | 7/2007 | Negley |
| 2007/0171145 | A1 | 7/2007 | Coleman |
| 2007/0236911 | A1 | 10/2007 | Negley |
| 2007/0267459 | A1 | 11/2007 | Van de Ven |
| 2007/0268703 | A1 | 11/2007 | Gasquet et al. |
| 2007/0274063 | A1 | 11/2007 | Negley |
| 2007/0274080 | A1 | 11/2007 | Negley |
| 2007/0278503 | A1 | 12/2007 | Van de Ven |
| 2007/0278934 | A1 | 12/2007 | Van de Ven |
| 2007/0279440 | A1 | 12/2007 | Negley |
| 2007/0280624 | A1 | 12/2007 | Negley |
| 2008/0030993 | A1 | 2/2008 | Narendran et al. |
| 2008/0049438 | A1 | 2/2008 | Bloemen et al. |
| 2008/0054281 | A1 | 3/2008 | Narendran et al. |
| 2008/0084685 | A1 | 4/2008 | Van de Ven |
| 2008/0088248 | A1 | 4/2008 | Myers |
| 2008/0089053 | A1 | 4/2008 | Negley |
| 2008/0094829 | A1 | 4/2008 | Narendran et al. |
| 2008/0105887 | A1 | 5/2008 | Narendran et al. |
| 2008/0106895 | A1 | 5/2008 | Van de Ven |
| 2008/0117500 | A1 | 5/2008 | Narendran et al. |
| 2008/0130285 | A1 | 6/2008 | Negley |
| 2008/0130298 | A1 | 6/2008 | Negley |
| 2008/0136313 | A1 | 6/2008 | Van de Ven |
| 2008/0198572 | A1 | 8/2008 | Medendorp |
| 2008/0231169 | A1 * | 9/2008 | Hata et al. ............ 313/500 |
| 2008/0259589 | A1 | 10/2008 | Van de Ven |
| 2008/0278928 | A1 | 11/2008 | Van de Ven |
| 2008/0278940 | A1 | 11/2008 | Van de Ven |
| 2008/0304260 | A1 | 12/2008 | Van de Ven |
| 2008/0304261 | A1 | 12/2008 | Van de Ven |
| 2008/0309255 | A1 | 12/2008 | Myers |
| 2009/0021926 | A1 | 1/2009 | Wang et al. |
| 2009/0103293 | A1 | 4/2009 | Harbers et al. |
| 2009/0108269 | A1 | 4/2009 | Negley |
| 2009/0184616 | A1 | 7/2009 | Van de Ven |
| 2009/0184666 | A1 | 7/2009 | Myers |
| 2010/0020532 | A1 | 1/2010 | Negley |
| 2010/0102697 | A1 | 4/2010 | Van De Ven |

FOREIGN PATENT DOCUMENTS

| | | |
|---|---|---|
| JP | 2005-332963 | 12/2005 |
| WO | 2004/068597 A2 | 8/2004 |
| WO | 2004/100226 A2 | 11/2004 |
| WO | 2006/061728 | 6/2006 |
| WO | 2007/002234 | 1/2007 |
| WO | 2007/075742 | 7/2007 |
| WO | 2008/023313 | 2/2008 |
| WO | 2009/049019 | 4/2009 |

OTHER PUBLICATIONS

Kim et al., "Strongly Enhanced Phosphor Efficiency in GaInN White Light-Emitting Diodes Using Remote Phosphor Configuration and Diffuse Reflector Cup", Japanese Journal of Applied Physics, vol. 44, Nows. 21, 2005, pp. L649-L651.

LEDsMagazine, Remote phosphor technique improves white LED output, Apr. 14, 2005, http://www.ledsmagazine.com/news/2/4/22, pp. 1.

High Efficiency, Nitride-Based, Solid-State Lighting, Summary of UCSB Research, Summary of LRC Research, www.lre.rpi.edu/programs/solidstate/cr_nitridebasedssl.asp, pp. 1-2.

Narendran et al., Extracting phosphor-scattered photons to improve white LED efficiency, Wiley InterScience :: Journals :: physica status solidi (a), Rapid Research Letter, Mar. 17, 2005, http://www3.interscience.wiley.com/journal/110437401/abstract, Abstract.

Narendran, *Improved Performance White LED*, Nov. 2005, Society of Photo-Optical Instrumentation Engineers, Fifth International Conference on Solid State Lighting, Proceedings of SPIE 5941, pp. 1-7.

Narendran, *Improving the performance of mixed-color white LED systems by using scattered photon extraction technique*, 2007 Copyright SPIE, The International Society for Optical Engineering, Seventh International Conference on Solid State Lighting, Proceedings of SPIE, Aug. 27, 2007, pp. 1-2, Sep. 17, 2007.

LRC Solid-State Lighting Papers and Publications, pp. 1-4, Feb. 2, 2006.

* cited by examiner

SOLID STATE LIGHTING DEVICES HAVING REMOTE LUMINESCENT MATERIAL-CONTAINING ELEMENT, AND LIGHTING METHODS

CROSS-REFERENCE TO RELATED APPLICATIONS

This application is a continuation of U.S. patent application Ser. No. 12/465,203 (now U.S. Patent Publication No. 2010/0290208), filed May 13, 2009, the entirety of which is incorporated herein by reference as if set forth in its entirety.

FIELD OF THE INVENTIVE SUBJECT MATTER

The present inventive subject matter relates to solid state lighting devices having solid state light emitters that are spaced from luminescent material-containing elements and that are spaced from other solid state light emitters. In some embodiments, the present inventive subject matter relates to lighting devices in which light emitted by one group of solid state light emitters travels farther within the lighting device than light emitted by another group of solid state light emitters.

BACKGROUND

There is an ongoing effort to develop systems that are more energy-efficient. A large proportion (some estimates are as high as twenty-five percent) of the electricity generated in the United States each year goes to lighting, a large portion of which is general illumination (e.g., downlights, flood lights, spotlights and other general residential or commercial illumination products). Accordingly, there is an ongoing need to provide lighting which is more energy-efficient.

Solid state light emitters (e.g., light emitting diodes) are receiving much attention due to their energy efficiency. It is well known that incandescent light bulbs are very energy-inefficient light sources—about ninety percent of the electricity they consume is released as heat rather than light. Fluorescent light bulbs are more efficient than incandescent light bulbs (by a factor of about 10) but are still less efficient than solid state light emitters, such as light emitting diodes.

In addition, as compared to the normal lifetimes of solid state light emitters, e.g., light emitting diodes, incandescent light bulbs have relatively short lifetimes, i.e., typically about 750-1000 hours. In comparison, light emitting diodes, for example, have typical lifetimes between 50,000 and 70,000 hours. Fluorescent bulbs have longer lifetimes (e.g., 10,000-20,000 hours) than incandescent lights, but provide less favorable color reproduction.

Another issue faced by conventional light fixtures is the need to periodically replace the lighting devices (e.g., light bulbs, etc.). Such issues are particularly pronounced where access is difficult (e.g., vaulted ceilings, bridges, high buildings, traffic tunnels) and/or where change-out costs are extremely high. The typical lifetime of conventional fixtures is about 20 years, corresponding to a light-producing device usage of at least about 44,000 hours (based on usage of 6 hours per day for 20 years). Light-producing device lifetime is typically much shorter, thus creating the need for periodic change-outs.

General illumination devices are typically rated in terms of their color reproduction, i.e., the extent to which objects illuminated by the illumination devices are perceived to be the color that they actually are. Color reproduction is typically measured using the Color Rendering Index (CRI Ra). CRI Ra is a modified average of the relative measurements of how the color rendition of an illumination system compares to that of a reference radiator when illuminating eight reference colors, i.e., it is a relative measure of the shift in surface color of an object when lit by a particular lamp. The CRI Ra equals 100 if the color coordinates of a set of test colors being illuminated by the illumination system are the same as the coordinates of the same test colors being irradiated by the reference radiator. Daylight has a high CRI (Ra of approximately 100), with incandescent bulbs also being relatively close (Ra greater than 95), and fluorescent lighting being less accurate (typical Ra of 70-80). Certain types of specialized lighting have very low CRI (e.g., mercury vapor or sodium lamps have Ra as low as about 40 or even lower). Sodium lights are used, e.g., to light highways—driver response time, however, significantly decreases with lower CRI Ra values (for any given brightness, legibility decreases with lower CRI Ra).

Accordingly, for these and other reasons, efforts have been ongoing to develop ways by which solid state light emitters can be used in place of incandescent lights, fluorescent lights and other light-generating devices in a wide variety of applications. In addition, where light emitting diodes (or other solid state light emitters) are already being used, efforts are ongoing to provide light emitting diodes (or other solid state light emitters) which are improved, e.g., with respect to energy efficiency, color rendering index (CRI Ra), contrast, efficacy (lm/W), and/or duration of service.

Although the development of light emitting diodes has in many ways revolutionized the lighting industry, some of the characteristics of light emitting diodes have presented challenges, some of which have not yet been fully met. For example, solid state light emitters are commonly seen in indicator lamps and the like, and in some other types of lighting, but are not yet in widespread use for general illumination.

The most common type of general illumination is white light (or near white light), i.e., light that is close to the blackbody locus, e.g., within about 4 MacAdam ellipses of the blackbody locus on a 1931 CIE Chromaticity Diagram. The 1931 CIE Chromaticity Diagram (an international standard for primary colors established in 1931), and the 1976 CIE Chromaticity Diagram (similar to the 1931 Diagram but modified such that similar distances on the Diagram represent similar perceived differences in color) provide useful reference for defining colors as weighted sums of primary colors.

Because light that is perceived as white is necessarily a blend of light of two or more colors (or wavelengths), no single light emitting diode junction has been developed that can produce white light. "White" solid state light emitting lamps have been produced by providing devices that mix different colors of light, e.g., by using light emitting diodes that emit light of differing respective colors and/or by converting some or all of the light emitted from the light emitting diodes using luminescent material. For example, as is well known, some lamps use red, green and blue light emitting diodes, and other lamps use (1) one or more light emitting diodes that generate blue light and (2) luminescent material (e.g., one or more phosphor materials) that emits yellow light in response to excitation by light emitted by the light emitting diode, whereby the blue light and the yellow light, when mixed, produce light that is perceived as white light. While there is a need for more efficient white lighting, there is in general a need for more efficient lighting in all hues.

In the case of conventional solid state light emitting devices that include one or more luminescent materials, a significant proportion (e.g., in many cases, as much as 20% to 25%) of the excitation light (e.g., light from the light emitting diode(s) that is converted in the luminescent material(s)) is reflected from the phosphor back into the light emitting diode(s) (a phenomenon sometimes referred to as "back-scattering"). Back-scattered light that is scattered back into a light emitting diode has a very low probability of coming out of the chip, and hence, such-back-scattering results in a system loss of energy.

In addition, light that is converted by a luminescent material is often emitted omni-directionally, so that in general, 50% of the light is directed back toward its source (e.g., the light emitting diode).

Furthermore, if the luminescent material(s) is/are contained in a luminescent material-containing element (e.g., a substantially transparent element in which the luminescent material is dispersed), depending on the thickness of the luminescent material-containing element and/or the loading of luminescent material in the luminescent material-containing element, significant "self-absorption" may occur. Self-absorption occurs when light that is absorbed, converted and re-emitted by luminescent material is re-absorbed by luminescent material or otherwise prevented from exiting the luminescent material-containing element, thus reducing performance (intensity) and efficiency.

Various lighting devices have been provided in which light emitting diodes are spaced from luminescent material.

For example, U.S. Pat. No. 5,959,316 (Lowery '316) discloses a semiconductor device which has a light-emitting diode covered by a transparent spacer which separates the LED from a uniformly thick fluorescent material containing layer. Referring now to FIG. 3, therein is shown a lead frame 12 with the reflector 16 which holds the LED 18. A transparent spacer 50 is shown encapsulating the LED 18, and a level of fluorescent material 52 is shown disposed above the transparent spacer 50.

U.S. Pat. No. 6,350,041 (Tarsa '041) discloses a solid state lamp emitting a light that comprises a solid state Light Source which transmits light through a Separator to a Disperser that disperses the light in a desired pattern and/or changes its color. The Disperser 16 can shape or distribute the light in a predefined pattern (such as radially uniform) and it may also contain elements, such as phosphors, fluorescent polymers and/or dyes, to change the wavelength of at least some of the incident light.

Zhu et al., "Optimizing the Performance of Remote Phosphor LED," First International Conference on White LEDs and Solid State Lighting, contains a statement that the interest for remote phosphor LEDs—where the LED chip and the phosphor layer are physically separated—has been growing. Zhu et al. states that the first remote phosphor LED configuration was proposed in 1995, and that since then, several remote phosphor LED concepts have been proposed. Zhu states that it was not until the middle of the present decade that the benefits of remote-phosphor LEDs were quantified, and that these studies showed improved life and higher luminous efficacy for remote phosphor LEDs compared to traditional PC white LEDs.

U.S. Pat. No. 6,936,857 (Doxsee '857) discloses a visible light emitting device comprising an LED or laser diode and a phosphor. In one arrangement, Doxsee '857 discloses that there is a space 16 between the LED and the phosphor, and such space 16 can be either a vacuum or filled with a transparent gas or solid.

U.S. Pat. No. 6,841,804 (Chen '804) discloses a white light emitting diode device. According to Chen '804, unlike conventional techniques, the reflective approach does not apply the yellow phosphor directly on the blue LEDs. Instead, a layer of the yellow phosphor is applied on the reflector, or alternatively, on a transparent film, which is then attached to the reflector. When the blue light emitted from the blue LEDs is mixed with the yellow light generated by the yellow phosphor stimulated by the blue light, a white light is generated. Then, the reflector reflects the white light to light the area or object. Chen '804 states that as the yellow phosphor is not directly applied on the LEDs, it is not damaged by the heat generated by the LEDs.

BRIEF SUMMARY OF THE INVENTIVE SUBJECT MATTER

Despite these efforts, there remains a need in the lighting industry for lighting devices that achieve desired performance (intensity, CRI Ra, efficiency, low cost, useful life) and which take up less space, in many cases the desire being to reduce the depth of the device, i.e., reduce the dimension of the device in a direction that is (1) perpendicular to an axis of the light emission from the lighting device, and/or (2) perpendicular to a direction of maximum intensity of light emission from the lighting device, and/or (3) perpendicular to a mean direction of light emission from the lighting device, and/or (4) perpendicular to a surface through which light exits the lighting device (e.g., a surface of a lens).

There is therefore an ongoing need for ways to use solid state light emitters, e.g., light emitting diodes, in a wider variety of applications, with greater energy efficiency, reduced size, improved color rendering index (CRI Ra), improved efficacy (lm/W), low cost, and/or longer duration of service.

In some embodiments in accordance with the present inventive subject matter, there are provided lighting devices in which an element that contains luminescent material is provided, a first group of solid state light emitters is provided, a second group of solid state light emitters is provided and is spaced from the element that contains luminescent material, and most of the light emitted by the second group of solid state light emitters enters the element that contains luminescent material before mixing with the light emitted by the first group of solid state light emitters. In other embodiments, most of the light exiting the lighting device that was emitted by the second group of solid state light emitters travels farther within the lighting device than most of the light exiting the lighting device that was emitted by the first group of solid state light emitters. In other embodiments, the average distance traveled by light exiting the lighting device that was emitted by the second group of solid state light emitters is at least 25% farther than an average distance traveled by light exiting the lighting device that was emitted by the second group of solid state light emitters.

In accordance with the present inventive subject matter, there is provided a lighting device that comprises a first group of solid state light emitters comprising at least a first solid state light emitter.

In accordance with the present inventive subject matter, there is also provided a lighting device that comprises a first group of solid state light emitters comprising at least a first solid state light emitter and a second group of solid state light emitters comprising at least a second solid state light emitter.

In accordance with the present inventive subject matter, there is also provided a lighting device that comprises a luminescent material-containing element comprising at least one luminescent material.

In accordance with the present inventive subject matter, there is also provided a lighting device that comprises a luminescent material-containing element comprising at least one luminescent material, as well as (a) a first group of solid state light emitters comprising at least a first solid state light emitter, and/or (b) a second group of solid state light emitters comprising at least a second solid state light emitter.

In accordance with some embodiments of the present inventive subject matter, there is provided a lighting device comprising:

a first group of solid state light emitters comprising at least a first solid state light emitter;

a second group of solid state light emitters comprising at least a second solid state light emitter; and a luminescent material-containing element comprising at least one luminescent material, the second group of solid state light emitters being spaced from the luminescent material-containing element, wherein at least 50% of the light emitted by the first solid state light emitter does not mix with any light emitted by any of the second group of solid state light emitters until after the light emitted by the second solid state light emitters has entered the luminescent material-containing element.

The expression "mix", as used herein, e.g., in the expression "at least 50% of the light emitted by the first solid state light emitter does not mix with any light emitted by any of the second group of solid state light emitters until after the light emitted by the second solid state light emitters has entered the luminescent material-containing element" means that in order for a particular region to be considered as a location where respective emissions of light "mix" (to become mixed, i.e., respective emissions of light "mix" within such region), at least 0.01% of each emission would pass through each square centimeter-sized portion surrounding that region.

The expression "enter" (or "entered"), as used herein, e.g., in the expression "at least 50% of the light emitted by the first solid state light emitter does not mix with any light emitted by any of the second group of solid state light emitters until after the light emitted by the second solid state light emitters has entered the luminescent material-containing element" means that the light emission that is referred to as having "entered" the luminescent material-containing element is incident upon the luminescent material-containing element and penetrates it to at least some distance, regardless of what the light emission does thereafter, i.e., regardless of whether it passes through the luminescent material-containing element, is reflected within the luminescent material-containing element, is absorbed within the luminescent material-containing element, is down-converted or up-converted within the luminescent material, etc., regardless of whether the light emission ever exits the luminescent material-containing element, and regardless of whether the light emission originated inside the luminescent material-containing element (e.g., if a light emitting diode is embedded within the luminescent material-containing element, light that is emitted by the light emitting diode and either exits from the luminescent material-containing element or only penetrates the luminescent material-containing element a portion of the thickness of the luminescent material-containing element and never exits from the luminescent material-containing element does "enter" the luminescent material-containing element as the expression "enter" is defined herein).

In some of such embodiments, at least 75% of the light emitted by the second solid state light emitter enters the luminescent material-containing element before reaching an emission plane of the first solid state light emitter.

In accordance with some embodiments of the present inventive subject matter, there is provided a lighting device comprising:

a first group of solid state light emitters comprising at least a first solid state light emitter;

a second group of solid state light emitters comprising at least a second solid state light emitter; and a luminescent material-containing element comprising at least one luminescent material, the second group of solid state light emitters being spaced from the luminescent material-containing element, wherein at least 90% of light exiting the lighting device that was emitted by the second group of solid state light emitters travels at least 25% farther within the lighting device than 90% of light exiting the lighting device that was emitted by the first group of solid state light emitters.

In accordance with some embodiments of the present inventive subject matter, there is provided a lighting device comprising:

a first group of solid state light emitters comprising at least a first solid state light emitter;

a second group of solid state light emitters comprising at least a second solid state light emitter; and a luminescent material-containing element comprising at least one luminescent material, the second group of solid state light emitters being spaced from the luminescent material-containing element, wherein an average distance traveled by light exiting the lighting device that was emitted by the second group of solid state light emitters is at least 25% farther than an average distance traveled by light exiting the lighting device that was emitted by the second group of solid state light emitters.

In accordance with some embodiments of the present inventive subject matter, there is provided a lighting device comprising:

a first group of solid state light emitters;

a luminescent material-containing element comprising at least one luminescent material;

a second group of solid state light emitters spaced from the luminescent material-containing element, wherein the lighting device is configured such that light emitted by the first group of solid state light emitters that directly exits the lighting device exits the lighting device without being incident upon the luminescent material-containing element.

In accordance with some embodiments of the present inventive subject matter, there is provided a lighting device comprising:

a first group of solid state light emitters comprising at least a first solid state light emitter;

a second group of solid state light emitters comprising at least a second solid state light emitter; and a luminescent material-containing element comprising at least one luminescent material, the second group of solid state light emitters being spaced from the luminescent material-containing element, wherein at least 75% of the light emitted by the second solid state light emitter enters the luminescent material-containing element before reaching an emission plane of the first solid state light emitter.

In accordance with some embodiments of the present inventive subject matter, there is provided a lighting device comprising:

a first group of solid state light emitters comprising at least a first solid state light emitter;

a second group of solid state light emitters comprising at least a second solid state light emitter; and a luminescent material-containing element comprising at least one luminescent material, the second group of solid state light emitters being spaced from the luminescent material-containing element, wherein at least 75% of the light emitted by the second solid state light emitter enters the luminescent material-containing element before reaching a first plane that is:

parallel to an emission plane of the first solid state light emitter, positioned between the emission plane of the first solid state light emitter, and spaced from the emission plane of the first solid state light emitter by a distance that is not greater than one fifth of a largest dimension of the luminescent material-containing element.

In accordance with some embodiments of the present inventive subject matter, there is provided a lighting device comprising:

a first group of solid state light emitters comprising at least a first solid state light emitter;

a second group of solid state light emitters comprising at least a second solid state light emitter; and a luminescent material-containing element comprising at least one luminescent material, the second group of solid state light emitters being spaced from the luminescent material-containing element, wherein 75% of the light emitted by the second solid state light emitter that reaches an emission plane of the first solid state light emitter, enters the luminescent material-containing element before reaching the emission plane of the first solid state light emitter.

In some embodiments in accordance with the present inventive subject matter, at least a portion of the luminescent material-containing element is substantially transparent, and at least 75% of the light emitted by the second group of solid state light emitters passes through the luminescent material-containing element and through the emission plane of the first solid state light emitter.

In some embodiments in accordance with the present inventive subject matter, including some of the embodiments that include the feature as discussed above, the luminescent material-containing element (and/or at least one surface thereof) is substantially parallel to the emission plane of the first solid state light emitter.

In some embodiments in accordance with the present inventive subject matter, the emission plane of the first solid state light emitter extends through at least a portion of the luminescent material-containing element.

In some embodiments in accordance with the present inventive subject matter, including some of the embodiments that include features as discussed above, the luminescent material-containing element is adjacent to a first support element on which the first solid state light emitter is mounted.

In some embodiments in accordance with the present inventive subject matter, including some of the embodiments that include features as discussed above, light emitted by the second solid state light emitter is surrounded by light emitted by the first group of solid state light emitters.

In some embodiments in accordance with the present inventive subject matter, including some of the embodiments that include features as discussed above, light emitted by the first solid state light emitter is surrounded by light emitted by the second group of solid state light emitters.

In some embodiments in accordance with the present inventive subject matter, including some of the embodiments that include features as discussed above, the first group of solid state light emitters comprises a plurality of solid state light emitters which each have respective emission planes that are substantially parallel to the emission plane of the first solid state light emitter.

In some embodiments in accordance with the present inventive subject matter, including some of the embodiments that include features as discussed above, the first solid state light emitter is mounted on a first support element that defines a first support element opening in which the luminescent material-containing element is positioned. In some of such embodiments, substantially all of the light exiting the lighting device that was emitted by the second group of solid state light emitters passes through the luminescent material-containing element and through the first support element opening. In some of such embodiments, substantially all of the light exiting the lighting device that was emitted by the second group of solid state light emitters passes simultaneously through the luminescent material-containing element and through the first support element opening.

In some embodiments in accordance with the present inventive subject matter, including some of the embodiments that include features as discussed above, the first solid state light emitter is mounted on a first support element, and the luminescent material-containing element defines a luminescent material-containing element opening in which the first support element is positioned.

In some embodiments in accordance with the present inventive subject matter, including some of the embodiments that include features as discussed above, the first solid state light emitter is mounted on the luminescent material-containing element.

In some embodiments in accordance with the present inventive subject matter, including some of the embodiments that include features as discussed above, substantially all light exiting the lighting device that was emitted by the second group of solid state light emitters enters the luminescent material-containing element, and at least 50% of light exiting the lighting device that was emitted by the first group of solid state light emitters does not enter the luminescent material-containing element.

In some embodiments in accordance with the present inventive subject matter, including some of the embodiments that include features as discussed above, at least a portion of the luminescent material-containing element is positioned between the first group of solid state light emitters and the second group of solid state light emitters.

In some embodiments in accordance with the present inventive subject matter, including some of the embodiments that include features as discussed above, the lighting device further comprises a housing and a diffuser which together define a space, and at least 90% of light exiting the lighting device that was emitted by the second group of solid state light emitters travels within the space at least 25% farther than 90% of light exiting the lighting device that was emitted by the first group of solid state light emitters.

In some embodiments in accordance with the present inventive subject matter, including some of the embodiments that include features as discussed above, when the first solid state light emitter is illuminated, the first solid state light emitter emits light having a dominant wavelength in the range of from about 590 nm to about 650 nm.

In some embodiments in accordance with the present inventive subject matter, including some of the embodiments that include features as discussed above, when the first solid state light emitter is illuminated, the second solid state light emitter emits light having a peak wavelength in the range of from about 400 nm to about 490 nm.

In some embodiments in accordance with the present inventive subject matter, including some of the embodiments that include features as discussed above, when the luminescent material is excited, it emits light having a dominant wavelength in the range of from about 490 nm to about 590 nm.

In some embodiments in accordance with the present inventive subject matter, including some of the embodiments that include features as discussed above, at least a portion of the luminescent material-containing element is substantially transparent.

In some embodiments in accordance with the present inventive subject matter, including some of the embodiments that include features as discussed above, at least a portion of the luminescent material-containing element is reflective.

The inventive subject matter may be more fully understood with reference to the accompanying drawings and the following detailed description of the inventive subject matter.

BRIEF DESCRIPTION OF THE DRAWING FIGURES

DETAILED DESCRIPTION OF THE INVENTIVE SUBJECT MATTER

Figure 1:
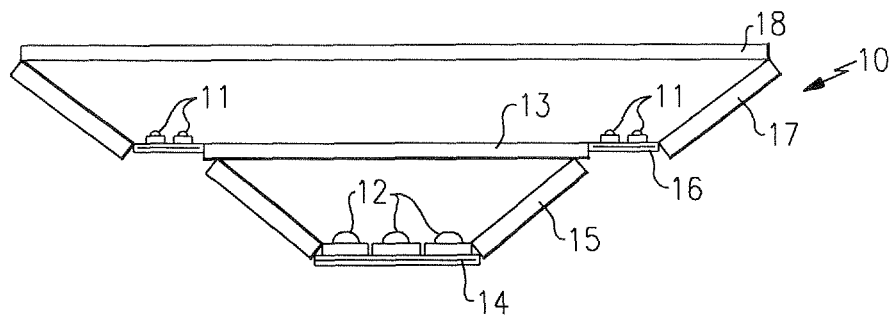
FIG. 1 depicts a lighting device in accordance with the present inventive subject matter.

The present inventive subject matter now will be described more fully hereinafter with reference to the accompanying drawings, in which embodiments of the inventive subject matter are shown. However, this inventive subject matter should not be construed as limited to the embodiments set forth herein. Rather, these embodiments are provided so that this disclosure will be thorough and complete, and will fully convey the scope of the inventive subject matter to those skilled in the art. Like numbers refer to like elements throughout. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless the context clearly indicates otherwise. It will be further understood that the Willis "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The expression "illumination" (or "illuminated"), as used herein when referring to a solid state light emitter, means that at least some current is being supplied to the solid state light emitter to cause the solid state light emitter to emit at least some light. The expression "illuminated" encompasses situations where the solid state light emitter emits light continuously, or intermittently at a rate such that a human eye would perceive it as emitting light continuously or intermittently, or where a plurality of solid state light emitters of the same color or different colors are emitting light intermittently and/or alternatingly (with or without overlap in "on" times) in such a way that a human eye would perceive them as emitting light continuously or intermittently (and, in some cases where different colors are emitted, as a mixture of those colors).

The expression "excited", as used herein when referring to luminescent material, means that at least some electromagnetic radiation (e.g., visible light, UV light or infrared light) is entering the luminescent material, causing the luminescent material to emit at least some light. The expression "excited" encompasses situations where the luminescent material emits light continuously, or intermittently at a rate such that a human eye would perceive it as emitting light continuously or intermittently, or where a plurality of luminescent materials of the same color or different colors are emitting light intermittently and/or alternatingly (with or without overlap in "on" times) in such a way that a human eye would perceive them as emitting light continuously or intermittently (and, in some cases where different colors are emitted, as a mixture of those colors).

When an element such as a layer, region or substrate is referred to herein as being "on" or extending "onto" another element, it can be directly on or extend directly onto the other element or intervening elements may also be present. In contrast, when an element is referred to herein as being "directly on" or extending "directly onto" another element, there are no intervening elements present. Also, when an element is referred to herein as being "connected" or "coupled" to another element, it can be directly connected or coupled to the other element or intervening elements may be present. In contrast, when an element is referred to herein as being "directly connected" or "directly coupled" to another element, there are no intervening elements present. In addition, a statement that a first element is "on" a second element is synonymous with a statement that the second element is "on" the first element.

Although the terms "first", "second", etc. may be used herein to describe various elements, components, regions, layers, sections and/or parameters, these elements, components, regions, layers, sections and/or parameters should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive subject matter.

Relative terms, such as "lower", "bottom", "below", "upper", "top" or "above," may be used herein to describe one element's relationship to another elements as illustrated in the Figures. Such relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompass both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

The expression "lighting device", as used herein, is not limited, except that it indicates that the device is capable of emitting light. That is, a lighting device can be a device which illuminates an area or volume, e.g., a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, or a device or array of devices that illuminate an enclosure, or a device that is used for edge or back-lighting (e.g., back light poster, signage, LCD displays), bulb replacements (e.g., for replacing AC incandescent lights, low voltage lights, fluorescent lights, etc.), lights used for outdoor lighting, lights used for security lighting, lights used for exterior residential lighting (wall mounts, post/column mounts), ceiling fixtures/wall sconces, under cabinet lighting, lamps (floor and/or table and/or desk), landscape lighting, track lighting, task lighting, specialty lighting, ceiling fan lighting, archival/art display lighting, high vibration/impact lighting—work lights, etc., mirrors/vanity lighting, or any other light emitting device.

The present inventive subject matter further relates to an illuminated enclosure (the volume of which can be illuminated uniformly or non-uniformly), comprising an enclosed space and at least one lighting device according to the present inventive subject matter, wherein the lighting device illuminates at least a portion of the enclosed space (uniformly or non-uniformly).

The present inventive subject matter is further directed to an illuminated area, comprising at least one item, e.g., selected from among the group consisting of a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, etc., having mounted therein or thereon at least one lighting device as described herein.

The expression "adjacent", as used herein to refer to a spatial relationship between a first structure and a second structure, means that the first and second structures are nearby each other, e.g., the first structure is abutting the second structure (or the first structure is otherwise in contact with the second structure) or that the first structure is spaced slightly from the second structure, or that no other structure is positioned between the first structure and the second structure, or that no other similar structure is positioned between the first structure and the second structure.

The expression "substantially transparent", as used herein, means that at least 95% of the structure which is characterized as being substantially transparent allows passage of at least 90% of incident visible light having a wavelength within the range emitted by the solid state light emitters and the luminescent material in the lighting device.

The expression "substantially parallel" means that two planes diverge from each other at most by an angle of 10% of 90 degrees, i.e., 9.0 degrees, and in some cases, by not more than an angle of 3.0 degrees. The expression "substantially parallel" when referring to a relationship between a first plane and a relatively thin and flat element, is a relationship between the first plane and a plane defined along either major surface of the element, or a plane of substantial symmetry of the element.

The expression "substantially all", as used herein, means at least 90%, in some cases at least 95%, and in some cases at least 99%.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein. It will also be appreciated by those of skill in the art that references to a structure or feature that is disposed "adjacent" another feature may have portions that overlap or underlie the adjacent feature.

As noted above, in accordance with the present inventive subject matter, there is provided a lighting device comprising:

a first group of solid state light emitters comprising at least a first solid state light emitter;

a second group of solid state light emitters comprising at least a second solid state light emitter; and a luminescent material-containing element comprising at least one luminescent material.

The first group of solid state light emitters can consist of a single solid state light emitter or can comprise a plurality of solid state light emitters.

The second group of solid state light emitters can likewise consist of a single solid state light emitter or can comprise a plurality of solid state light emitters.

Any desired solid state light emitter or emitters can be employed in accordance with the present inventive subject matter. Persons of skill in the art are aware of, and have ready access to, a wide variety of such emitters. Such solid state light emitters include inorganic and organic light emitters. Examples of types of such light emitters include a wide variety of light emitting diodes (inorganic or organic, including polymer light emitting diodes (PLEDs)), laser diodes, thin film electroluminescent devices, light emitting polymers (LEPs), a variety of each of which are well known in the art (and therefore it is not necessary to describe in detail such devices, and/or the materials out of which such devices are made).

The respective light emitters can be similar to one another, different from one another, or any combination (i.e., there can be a plurality of solid state light emitters of one type, or one or more solid state light emitters of each of two or more types).

The lighting devices in accordance with the present inventive subject matter can comprise any desired number of solid state emitters. For example, a lighting device according to the present inventive subject matter can include 2 solid state light emitters, or 50 or more solid state light emitters, or 100 or more solid state light emitters, etc.

Light emitting diodes are semiconductor devices that convert electrical current into light. A wide variety of light emitting diodes are used in increasingly diverse fields for an ever-expanding range of purposes.

The expression "light emitting diode" is used herein to refer to the basic semiconductor diode structure (i.e., the chip). The commonly recognized and commercially available "LED" that is sold (for example) in electronics stores typically represents a "packaged" device made up of a number of parts. These packaged devices typically include a semiconductor based light emitting diode such as (but not limited to) those described in U.S. Pat. Nos. 4,918,487; 5,631,190; and 5,912,477; various wire connections, and a package that encapsulates the light emitting diode.

As is well known, a light emitting diode produces light by exciting electrons across the band gap between a conduction band and a valence band of a semiconductor active (light-emitting) layer. The electron transition generates light at a wavelength that depends on the band gap. Thus, the color of the light (wavelength) emitted by a light emitting diode depends on the semiconductor materials of the active layers of the light emitting diode.

The color (or colors, or range of colors, or ranges of colors) of light emitted by the first group of solid state light emitters can be any desired color (or colors, or range of colors, or ranges of colors). For example, the first group of solid state light emitters can be red, green, blue, cyan or combinations of light emitters that emit red, light emitters that emit green, light emitters that emit blue and/or light emitters that emit cyan. In some embodiments, the dominant wavelength of light emitted by the first group of solid state light emitters is in the range of from about 590 nm to about 650 nm.

The color (or colors, or range of colors, or ranges of colors) of light emitted by the second group of solid state light emitters can be any desired color (or colors, or range of colors, or ranges of colors). In some embodiments, the peak wavelength of light emitted by the second group of solid state light emitters is in the range of from about 400 nm to about 490 nm.

The combinations of colors (and/or ranges of colors) of light emitted by the first group of solid state light emitters and by the second group of solid state light emitters can be any desired combination of colors (or range of colors, or ranges of colors), or the color (or colors, or range of colors, or ranges of colors) of light emitted by the first group of solid state light emitters and the second group of solid state light emitters can be the same or similar.

In some embodiments in accordance with the present inventive subject matter, each of the solid state light emitters in the first group of solid state light emitters emit light of substantially similar dominant and/or peak wavelength (e.g., differing by not more than 20 nm, in some cases not more than 10 nm, and in some cases not more than 5 nm).

In some embodiments in accordance with the present inventive subject matter, each of the solid state light emitters in the second group of solid state light emitters emit light of substantially similar wavelength (e.g., peak and/or dominant wavelength differing by not more than 20 nm, in some cases not more than 10 nm, and in some cases not more than 5 nm).

In some embodiments in accordance with the present inventive subject matter, all of the luminescent material in the luminescent material-containing element emits light of substantially similar hue (e.g., differing by not more than 40 MacAdam ellipses, in some cases not more than 20 MacAdam ellipses, and in some cases not more than 10 MacAdam ellipses).

A wide variety of luminescent materials are known to those skilled in the art, and any of such materials, or combinations of such materials, can be used in accordance with the present inventive subject matter. For example, the one or more luminescent materials can be selected from among phosphors, scintillators, day glow tapes, inks which glow in the visible spectrum upon illumination with ultraviolet light, etc. The luminescent material (or materials) can be down-converting or up-converting, or can include a combination of both types.

The color (or colors, or range of colors, or ranges of colors) of light emitted by the luminescent material can be any desired color (or colors, or range of colors, or ranges of colors). In some embodiments, the dominant wavelength of light emitted by the luminescent material is in the range of from about 490 nm to about 590 nm. A representative example of a well known luminescent material is YAG.

Representative examples of suitable solid state light emitters, including suitable light emitting diodes, luminescent materials, encapsulants, etc., are described in:

U.S. patent application Ser. No. 11/614,180, filed Dec. 21, 2006 (now U.S. Patent Publication No. 2007/0236911), the entirety of which is hereby incorporated by reference as if set forth in its entirety;

U.S. patent application Ser. No. 11/624,811, filed Jan. 19, 2007 (now U.S. Patent Publication No. 2007/0170447), the entirety of which is hereby incorporated by reference as if set forth in its entirety;

U.S. patent application Ser. No. 11/751,982, filed May 22, 2007 (now U.S. Patent Publication No. 2007/0274080), the entirety of which is hereby incorporated by reference as if set forth in its entirety;

U.S. patent application Ser. No. 11/753,103, filed May 24, 2007 (now U.S. Patent Publication No. 2007/0280624), the entirety of which is hereby incorporated by reference as if set forth in its entirety;

U.S. patent application Ser. No. 11/751,990, filed May 22, 2007 (now U.S. Patent Publication No. 2007/0274063), the entirety of which is hereby incorporated by reference as if set forth in its entirety;

U.S. patent application Ser. No. 11/736,761, filed Apr. 18, 2007 (now U.S. Patent Publication No. 2007/0278934), the entirety of which is hereby incorporated by reference as if set forth in its entirety;

U.S. patent application Ser. No. 11/936,163, filed Nov. 7, 2007 (now U.S. Patent Publication No. 2008/0106895), the entirety of which is hereby incorporated by reference as if set forth in its entirety;

U.S. patent application Ser. No. 11/843,243, filed Aug. 22, 2007 (now U.S. Patent Publication No. 2008/0084685), the entirety of which is hereby incorporated by reference as if set forth in its entirety;

U.S. patent application Ser. No. 11/870,679, filed Oct. 11, 2007 (now U.S. Patent Publication No. 2008/0089053), the entirety of which is hereby incorporated by reference as if set forth in its entirety;

U.S. patent application Ser. No. 12/117,148, filed May 8, 2008 (now U.S. Patent Publication No. 2008/0304261), the entirety of which is hereby incorporated by reference as if set forth in its entirety; and U.S. patent application Ser. No. 12/017,676, filed on Jan. 22, 2008 (now U.S. Patent Publication No. 2009/0108269), the entirety of which is hereby incorporated by reference as if set forth in its entirety.

As noted above, in some embodiments in accordance with the present inventive subject matter, the lighting device can comprise more than two groups of solid state light emitters, e.g., a third group of solid state light emitters, in some cases a fourth group of solid state light emitters, etc., along with the at least one luminescent material. In such embodiments, the respective solid state light emitters and/or luminescent material(s) can be selected so as to emit any desired wavelengths or hues, and can be positioned and oriented such that any desired combinations of light mix in any desired combinations at any desired locations. Persons of skill in the art are familiar with and can readily envision a wide variety of combinations of light of different wavelengths and hues.

In some embodiments, the solid state light emitters in the first group of solid state light emitters, the solid state light emitters in the second group of solid state light emitters and the luminescent material are selected, oriented and proportioned as described in U.S. Pat. No. 7,213,940, issued on May 8, 2007, the entirety of which is hereby incorporated by reference as if set forth in its entirety, so as to provide light output that is perceived as white (or near white) with high efficacy and high CRI Ra.

In general, light of any number of colors can be mixed by the lighting devices according to the present inventive subject matter. Representative examples of blends of light colors are described in:

U.S. patent application Ser. No. 11/613,714, filed Dec. 20, 2006 (now U.S. Patent Publication No. 2007/0139920), the entirety of which is hereby incorporated by reference as if set forth in its entirety;

U.S. patent application Ser. No. 11/613,733, filed Dec. 20, 2006 (now U.S. Patent Publication No. 2007/0137074), the entirety of which is hereby incorporated by reference as if set forth in its entirety;

U.S. patent application Ser. No. 11/736,761, filed Apr. 18, 2007 (now U.S. Patent Publication No. 2007/0278934), the entirety of which is hereby incorporated by reference as if set forth in its entirety;

U.S. patent application Ser. No. 11/736,799, filed Apr. 18, 2007 (now U.S. Patent Publication No. 2007/0267983), the entirety of which is hereby incorporated by reference as if set forth in its entirety;

U.S. patent application Ser. No. 11/737,321, filed Apr. 19, 2007 (now U.S. Patent Publication No. 2007/0278503), the entirety of which is hereby incorporated by reference as if set forth in its entirety;

U.S. patent application Ser. No. 11/936,163, filed Nov. 7, 2007 (now U.S. Patent Publication No. 2008/0106895), the entirety of which is hereby incorporated by reference as if set forth in its entirety;

U.S. patent application Ser. No. 12/117,122, filed May 8, 2008 (now U.S. Patent Publication No. 2008/0304260), the entirety of which is hereby incorporated by reference as if set forth in its entirety;

U.S. patent application Ser. No. 12/117,131, filed May 8, 2008 (now U.S. Patent Publication No. 2008/0278940), the entirety of which is hereby incorporated by reference as if set forth in its entirety;

U.S. patent application Ser. No. 12/117,136, filed May 8, 2008 (now U.S. Patent Publication No. 2008/0278928), the entirety of which is hereby incorporated by reference as if set forth in its entirety;

U.S. Pat. No. 7,213,940, issued on May 8, 2007, the entirety of which is hereby incorporated by reference as if set forth in its entirety;

U.S. Patent Application No. 60/868,134, filed on Dec. 1, 2006, entitled "LIGHTING DEVICE AND LIGHTING METHOD" (inventors: Antony Paul van de Ven and Gerald H. Negley), the entirety of which is hereby incorporated by reference as if set forth in its entirety;

U.S. patent application Ser. No. 11/948,021, filed on Nov. 30, 2007 (now U.S. Patent Publication No. 2008/0130285), the entirety of which is hereby incorporated by reference as if set forth in its entirety;

U.S. patent application Ser. No. 12/248,220, filed on Oct. 9, 2008 (now U.S. Patent Publication No. 2009/0184616), the entirety of which is hereby incorporated by reference as if set forth in its entirety;

U.S. patent application Ser. No. 11/951,626, filed Dec. 6, 2007 (now U.S. Patent Publication No. 2008/0136313), the entirety of which is hereby incorporated by reference as if set forth in its entirety;

U.S. patent application Ser. No. 12/035,604, filed on Feb. 22, 2008 (now U.S. Patent Publication No. 2008/0259589), the entirety of which is hereby incorporated by reference as if set forth in its entirety;

U.S. patent application Ser. No. 12/117,148, filed May 8, 2008 (now U.S. Patent Publication No. 2008/0304261), the entirety of which is hereby incorporated by reference as if set forth in its entirety; and U.S. Patent Application No. 60/990,435, filed on Nov. 27, 2007, entitled "WARM WHITE ILLUMINATION WITH HIGH CRI AND HIGH EFFICACY" (inventors: Antony Paul van de Ven and Gerald H. Negley), the entirety of which is hereby incorporated by reference as if set forth in its entirety.

The present inventive subject matter also provides embodiments in which any desired combinations of red light, green light and blue light are provided to produce white light, e.g., devices which include at least one blue solid state light emitter and at least one green solid state light emitter with red luminescent material (i.e., at least one solid state light emitter that emits blue light, at least one green solid state light emitter that emits green light and luminescent material that emits red light); devices that include at least one blue solid state light emitter, at least one green solid state light emitter, at least one red solid state light emitter and red luminescent material; devices that include at least one blue solid state light emitter, green luminescent material and at least one red solid state light emitter, etc. (i.e., devices that may include any combination of emitters selected from among blue solid state light emitters, green solid state light emitters, red solid state light emitters, blue luminescent material, green luminescent material and red luminescent material, optionally in combination with light emitters (solid state light emitters and/or luminescent material) that emit light of any desired wavelength or hue.

The luminescent material-containing element can be any element that comprises at least one luminescent material. Persons of skill in the art are familiar with, and can readily make, wide varieties of elements that comprise one or more luminescent material.

For example, in some embodiments in accordance with the present inventive subject matter, the luminescent material-containing element (or elements) can comprise one or more substantially transparent materials with luminescent material dispersed within the substantially transparent material(s) and/or positioned on one or more surfaces of the substantially transparent material(s). Persons of skill in the art are familiar with luminescent material-containing elements, e.g., elements comprising a binder, e.g., made of epoxy, silicone, glass, metal oxide or any other suitable material, with one or more luminescent material(s) dispersed within the binder and/or applied to one or both primary surfaces of the luminescent material-containing element. In some embodiments, the luminescent material-containing element can be a part of a larger structure (for example, an integral structure can comprise a first region consisting of one or more substantially transparent material(s) and a second region comprising a luminescent material-containing element, and in some embodiments, the first region can extend from the second group of solid state light emitters to the luminescent material-containing element, whereby the integral structure is in contact with the second group of solid state light emitters but the luminescent material-containing element, which is part of the integral structure, is spaced from the second group of solid state light emitters.

In other embodiments in accordance with the present inventive subject matter, the luminescent material-containing element (or elements) can comprise one or more reflective (the expression "reflective", as used herein, encompasses light-reflecting as well as specular) materials (or at least partially reflective materials) and luminescent material (or materials) dispersed within the luminescent material-containing element and/or positioned on one or both surfaces of the luminescent material-containing element. For instance, in some embodiments, the luminescent material-containing element can consist of a reflective material with luminescent material on a surface of the reflective material that light from one or more of the solid state light emitters excites (such light can include light emitted by one or more of the solid state light emitters that has been converted by another luminescent material). Also by way of example, in some embodiments, the luminescent material-containing element can consist of a reflective material (or materials) and a substantially transparent material (or materials) through which light travels before being reflected.

The ability of the reflector to reflect light can be imparted in any desired way, a variety of which are well known to persons of skill in the art. For example, the reflector(s) can comprise one or more material that is reflective (and/or specular, the term "reflective" being used herein to refer to reflective and optionally also specular), and/or that can be treated (e.g., polished) so as to be reflective, or can comprise one or more material that is non-reflective or only partially reflective and which is coated with, laminated to and/or otherwise attached to a reflective material. Persons of skill in the art are familiar with a variety of materials that are reflective, e.g., metals such as aluminum or silver, a dielectric stack of materials forming a Bragg Reflector, a dichroic reflector coating on glass (e.g., as described at www.lumascape.com/pdf/literature/C1087US.pdf), any other thin film reflectors, etc. Persons of skill in the art are familiar with a wide variety of materials which are suitable for making a non-reflective or partially reflective structure which can be coated with, laminated to or otherwise attached to a reflective material, including for instance plastic materials such as polyethylene, polypropylene, natural or synthetic rubbers, polycarbonate or polycarbonate copolymer, PAR (poly(4,4'-isopropylidenediphenylene terephthalate/isophthalate) copolymer), PEI (polyctherimide), and LCP (liquid crystal polymer). The reflector(s) can be formed out of highly reflective aluminum sheet with various coatings, including silver, from companies like Alanod (http://www.alanod.de/opencms/alanod/index.html_2063069299.html.), or the reflector(s) can be formed from glass. In cases where a lighting device according to the present inventive subject matter comprises more than one reflector, the respective reflectors can be made of the same material, or any reflector (s) can be made of different materials.

The luminescent material-containing element can, as desired, consist of a single element, or can comprise a plurality of sub-elements any of which may be in contact, or not in contact, with any others.

In some embodiments, e.g., embodiments in which at least part of the luminescent material-containing element is transparent and some solid state light emitters are mounted on the luminescent material-containing element (e.g., embodiments 3 and 6 described below), the bottoms of some solid state light emitters can be reflective, so as to reflect light that would otherwise enter the solid state light emitters and possibly be absorbed therein.

In some embodiments in accordance with the present inventive subject matter, the lighting device further comprises a housing and a diffuser which together define a space.

Persons of skill in the art are familiar with, and can envision, a wide variety of materials out of which a housing can be constructed, and a wide variety of shapes for such housings, and housings made of any of such materials and having any of such shapes can be employed in accordance with the present inventive subject matter. In some embodiments that include a housing, at least a portion of the internal surface of the housing is highly reflective. Persons of skill in the art are familiar with, and can readily obtain, a wide variety of reflective materials for use in such housings. A representative example of a suitable material out of which a highly reflective surface can be made for such purposes is a material marketed by Furukawa (a Japanese corporation) under the trademark MCPET®.

Persons of skill in the art are familiar with a wide variety of diffusers, and can readily envision a variety of materials out of which a diffuser can be made, and are familiar and/or can envision a wide variety of shapes that diffusers can be. Any of such diffusers, materials and/or shapes can be employed as a diffuser in an embodiment that include a diffuser. As will be understood by persons skilled in the art, a diffuser in a lighting device according to the present inventive subject matter can be selected to have any desired effect on incident light (or no effect), such as focusing, diffusing, etc.

In embodiments in accordance with the present inventive subject matter that include a diffuser (or plural diffusers), the diffuser (or diffusers) can be positioned in any desired location and orientation.

Embodiments in accordance with the present inventive subject matter are described herein with reference to cross-sectional (and/or plan view) illustrations that are schematic illustrations of idealized embodiments of the present inventive subject matter. As such, variations from the shapes of the illustrations as a result, for example, of manufacturing techniques and/or tolerances, are to be expected. Thus, embodiments of the present inventive subject matter should not be construed as limited to the particular shapes of regions illustrated herein but are to include deviations in shapes that result, for example, from manufacturing. For example, a molded region illustrated or described as a rectangle will, typically, have rounded or curved features. Thus, the regions illustrated in the figures are schematic in nature and their shapes are not intended to illustrate the precise shape of a region of a device and are not intended to limit the scope of the present inventive subject matter.

The lighting devices illustrated in FIGS. 1 through 6 are illustrated with reference to cross-sectional drawings. These cross sections may be rotated around a central axis to provide lighting devices that are circular in nature. Alternatively, the cross sections may be replicated to form sides of a polygon, such as a square, rectangle, pentagon, hexagon or the like, to provide a lighting device. Thus, in some embodiments, objects in a center of the cross-section may be surrounded, either completely or partially, by objects at the edges of the cross-section.

FIG. 1 illustrates a lighting device 10 in accordance with the present inventive subject matter. The lighting device 10 comprises a first group of solid state light emitters 11, a second group of solid state light emitters 12 and a luminescent material-containing element 13 comprising a transparent element coated on its lower surface (in the orientation shown in FIG. 1) with luminescent material. As shown in FIG. 1, the second group of solid state light emitters 12 is spaced from the luminescent material-containing element 13.

The first group of solid state light emitters 11 can include light emitting diodes that emit red light, the second group of solid state light emitters 12 can include light emitting diodes that emit blue light and the luminescent material can be a phosphor that emits yellow light.

The solid state light emitters 12 are mounted to a thermally conductive substrate 14. The solid state light emitters 12 are surrounded by an expanding conic reflector 15. The reflector 15 can include highly reflective white material such as MCPET or Dupont. The light from the solid state light emitters 12 impinges upon the luminescent material-containing element 13. The luminescent material-containing element 13 can take any of several configurations in order to maximize light extraction, including the addition of an anti-reflective or index matching material between the phosphor and the transparent element (or at least partially transparent element) and/or a patterned or random surface roughness on the non-phosphor coated side. The transparent material could be polymeric or glass, and could be structural or simply a suspended film.

As an example, the first group of solid state light emitters 11 can be arranged as a ring of small signal red light emitting diodes on the same plane as the upper (in the orientation shown in FIG. 1) side of the phosphor coated lens. The first group of solid state light emitters 11 can be mounted to a thermally conductive annular substrate 16. This red saturated light, in combination with the unsaturated blue light/yellow light mixture, produces white light of variable color temperature. Additionally, if desired, small signal blue light emitting diodes (e.g., which produce light of peak wavelength at or near 477 nm) can be mixed with the red light emitting diodes to improve color rendering. This entire structure is surrounded by a large expanding conic reflector 17 of highly reflective diffuse white material. The combination of yellow/red or yellow/red/blue light passes through a diffuser 18, which is, in this embodiment, a surface treatment or patterned or random surface structure on the secondary lens, or a film with diffusion properties placed in front of a transparent lens. In this embodiment, the diffuser 18 provides enough obscuration to hide the individual point sources of the small signal light emitting diodes, as well as providing color mixing to provide a consistent white light.

As is seen in FIG. 1, light from the first group of solid state light emitters 11 may directly exit the lighting device 10 without being incident upon the luminescent material-containing element 13. As used herein, light directly exits a lighting device when it passes from a light emitter through an exit aperture of the lighting device without reflection. In the lighting device 10 of FIG. 1, the exit aperture of the lighting device 10 is defined by the reflector 17.

Figure 2:
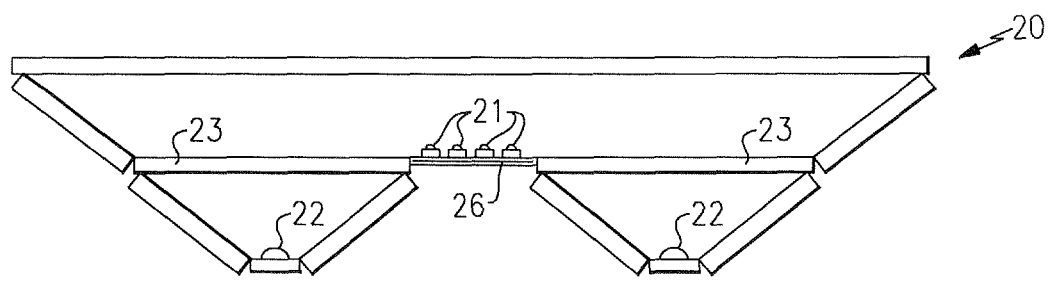
FIG. 2 depicts a lighting device in accordance with the present inventive subject matter.

FIG. 2 is a further example of a lighting device 20 in accordance with the present inventive subject matter. The lighting device 20 comprises a first group of solid state light emitters 21, a second group of solid state light emitters 22 and an annular luminescent material-containing element 23 comprising a transparent element, coated on its lower surface (in the orientation shown in FIG. 2) with luminescent material. As shown in FIG. 2, the second group of solid state light emitters 22 is spaced from the luminescent material-containing element 23.

The first group of solid state light emitters 21 can include light emitting diodes that emit red light, the second group of solid state light emitters 22 can include light emitting diodes that emit blue light and the luminescent material can be a phosphor that emits yellow light. The first group of solid state light emitters 21 are mounted to a thermally conductive substrate 26.

The lighting device 20 is similar to the lighting device 10 illustrated in FIG. 1, except that the lighting device 20 provides a ring of light emitting diodes (emitting, e.g., blue light) shining through a phosphor-coated element, with an "island" of light emitting diodes (emitting, e.g., red light) located in the center. Red light emitting diodes tend to be more visible in reflection with certain highly reflective diffuse white reflectors, and so moving them to the center rather than the exterior of the ring is advantageous in obscuration in some situations. Other aspects of the lighting device 20 illustrated in FIG. 2 are similar to those of the lighting device 10 illustrated in FIG. 1.

Figure 3:
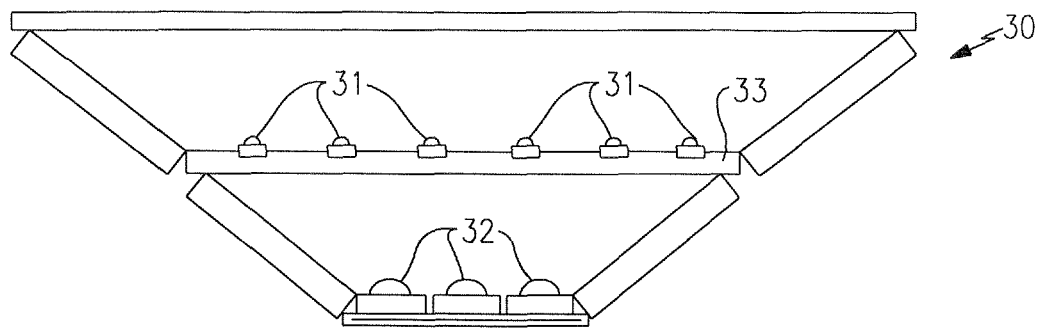
FIG. 3 depicts a lighting device in accordance with the present inventive subject matter.

FIG. 3 is a cross-sectional diagram of a lighting device 30 in accordance with further embodiments of the present inventive subject matter. The lighting device 30 comprises a first group of solid state light emitters 31, a second group of solid state light emitters 32 and a luminescent material-containing element 33, which can comprise a substantially transparent element, coated on its lower surface (in the orientation shown in FIG. 3) with luminescent material. As shown in FIG. 3, the second group of solid state light emitters 32 is spaced from the luminescent material-containing element 33.

The first group of solid state light emitters 31 can include light emitting diodes that emit red light, the second group of solid state light emitters 32 can include light emitting diodes that emit blue light and the luminescent material can be a phosphor that emits yellow light.

The luminescent material-containing element 33 can be a phosphor-coated substantially transparent heat sink. A transparent heat sink (or a substantially transparent heat sink) can be made of any material (or combination of materials) (1) which is transparent or which can be made to become transparent, and (2) which is a good conductor of heat (e.g., having a heat conductivity of at least 1 W/m-K). Representative examples of suitable materials include aluminum nitride (AlN), silicon carbide (SiC), diamond, diamond-like carbon (DLC), any of a variety of transparent polymeric materials, any of a variety of ceramic materials and any of a variety of glass materials. Alternatively, the substantially transparent heat sink can comprise a substantially transparent material (which can have a moderate heat conductivity or a lower heat conductivity, such as glass) and one or more elements of higher heat conducting capability (e.g., one or more wires, bars, layers, particles, regions and/or slivers) positioned within the substantially transparent material. Representative examples of suitable transparent heat sinks are described in U.S. Patent Application No. 61/108,130, filed on Oct. 24, 2008, entitled "LIGHTING DEVICE WHICH INCLUDES ONE OR MORE SOLID STATE LIGHT EMITTING DEVICE" (inventors: Antony Paul van de Ven and Gerald H. Negley), the entirety of which is hereby incorporated by reference as if set forth in its entirety.

In the lighting device 30 illustrated in FIG. 3, the circuit pattern for the red light emitting diodes is replicated directly on the surface of the transparent heat sink (i.e., the luminescent material-containing element 33). By "backlighting" the red light emitting diodes, obscuration is more easily achieved and superior color mixing with minimal diffusion is possible. It is also a compact implementation.

Figure 4:
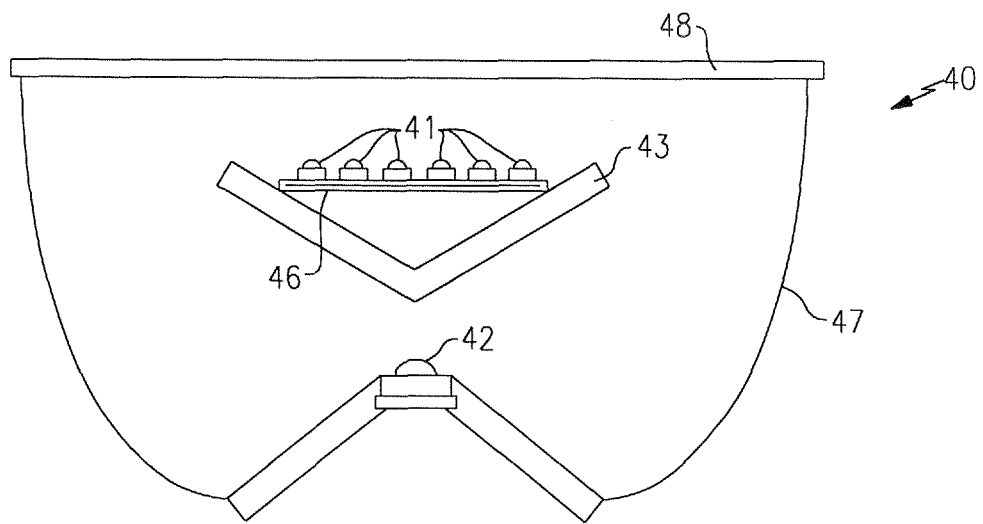
FIG. 4 depicts a lighting device in accordance with the present inventive subject matter.

FIG. 4 is a cross-sectional diagram of a lighting device 40 in accordance with the present inventive subject matter. The lighting device 40 can include a first group of solid state light emitters 41, a second group of solid state light emitters 42 (in some embodiments, consisting of a single solid state light emitter) and a luminescent material-containing element 43. The luminescent material-containing element 43 can include a highly reflective diffuser white reflector, coated on its lower surface (in the orientation shown in FIG. 4) with luminescent material. As shown in FIG. 4, the second group of solid state light emitters 42 is spaced from the luminescent material-containing element 43.

In the above description of the fourth embodiment, the luminescent material-containing element 43 is a reflector that has a phosphor. Alternatively, the luminescent material-containing element 43 can be a luminescent material (e.g., a phosphor) that can be a reflector or an element that can act as a luminescent material, or a reflector, or both.

The first group of solid state light emitters 41 can include light emitting diodes that emit red light, the second group of solid state light emitters 42 can include light emitting diodes that emit blue light and the luminescent material can be a phosphor that emits yellow light.

The lighting device 40 can utilize a single blue light emitting diode (alternatively, there could be plural blue light emitting diodes, if desired) that shines onto a phosphor-coated highly reflective diffuser white reflector as the luminescent material-containing element 43. The blue light emitting diode can be supported on a conic pedestal which also has a highly reflective diffuse white reflector covering. The blue light impinges the phosphor, creating yellow light. Any blue light not converted and penetrating the phosphor layer encounters the highly reflective diffuser white reflector and is bounced back into the phosphor layer a second time. Any yellow light generated by the phosphor that is not emitted in a useful direction is also bounced back and redirected into the active reflector area. By the nature of Lambertian emission, the strongest emission will be perpendicular to the emitting surface. Therefore, the phosphor substrate in this embodiment is conic rather than a flat plate, to direct the light away from the light emitting diode or light emitting diodes. The conic pedestal mount with its white diffuse reflector covering helps to direct light impacting it away from the light emitting diode or light emitting diodes. This light is gathered by a faceted or smooth specular reflector 47 and "aimed" toward the diffuser 48. The red light emitting diodes (or optionally red plus blue light emitting diodes) 41 are located on a thermally conductive substrate 46 located above the luminescent material-containing element 43, to mix with the blue light/yellow light mixture to create white light.

Figure 5:
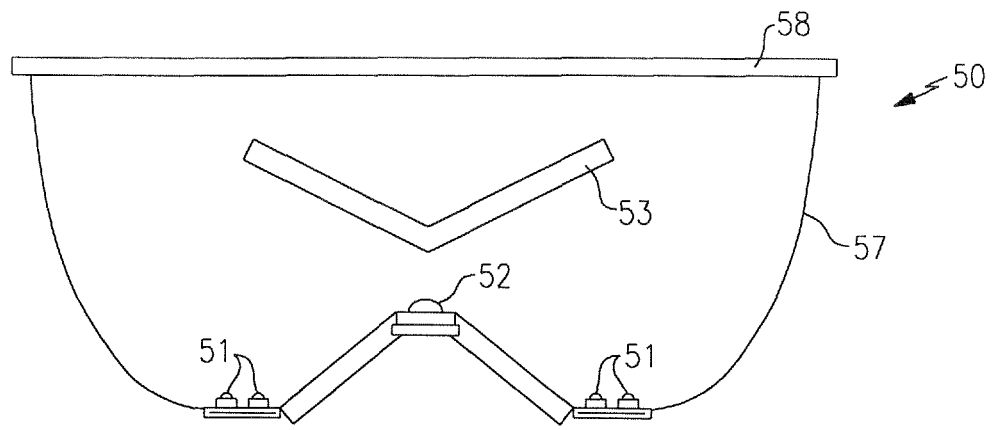
FIG. 5 depicts a lighting device in accordance with the present inventive subject matter.

FIG. 5 is an example of a lighting device 50 in accordance with the present inventive subject matter. The lighting device 50 comprises a first group of solid state light emitters 51, a second group of solid state light emitters 52 (in this embodiment, consisting of a single solid state light emitter) and a luminescent material-containing element 53 which can comprise a highly reflective diffuser white reflector, coated on its lower surface (in the orientation shown in FIG. 5) with luminescent material. As shown in FIG. 5, the second group of solid state light emitters 52 is spaced from the luminescent material-containing element 53.

The first group of solid state light emitters 51 can include light emitting diodes that emit red light, the second group of solid state light emitters 52 can include light emitting diodes that emit blue light and the luminescent material can be a phosphor that emits yellow light.

The lighting device 50 is similar to the lighting device 40, except that in the lighting device 50, the red (or red plus blue) light emitting diodes 51 are closer to the base of the specular "collector" reflector 57, to maximize the distance between the directly viewable light emitting diodes and the diffuser 58, and to decrease the contrast ratio between the red light emitting diodes and the surrounding material. By placing the red light emitting diodes (or optionally red plus blue light emitting diodes) in the bottom of a very bright reflector, the ability to obscure the light emitting diodes with minimal diffusion is increased.

Figure 6:
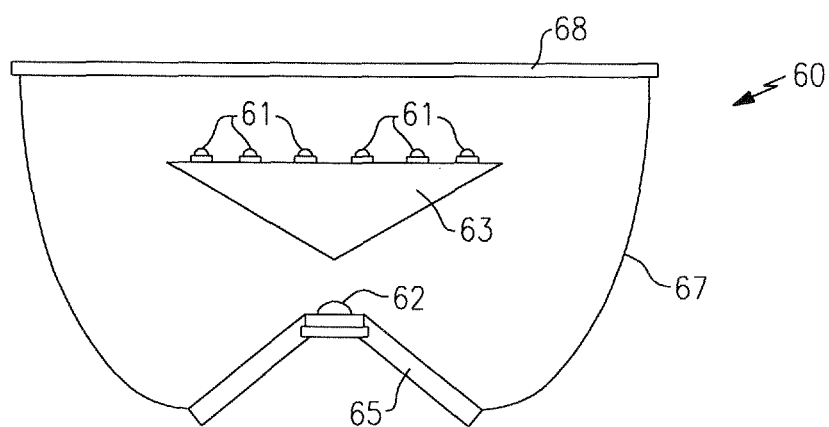
FIG. 6 depicts a lighting device in accordance with the present inventive subject matter.

FIG. 6 illustrates a lighting device 60 in accordance with the present inventive subject matter. The lighting device 60 comprises a first group of solid state light emitters 61, a second group of solid state light emitters 62 (in some embodiments, consisting of a single solid state light emitter) and a luminescent material-containing element 63 that can comprise a transparent heat sink, coated on its lower conical surface (i.e., lower in the orientation shown in FIG. 6) with luminescent material. As shown in FIG. 6, the second group of solid state light emitters 62 is spaced from the luminescent material-containing element 63.

The first group of solid state light emitters 61 can include light emitting diodes that emit red light, the second group of solid state light emitters 62 can be a light emitting diode that emits blue light and the luminescent material can be a phosphor that emits yellow light.

The lighting device 60 is similar to the lighting device 40, except that the lighting device 60 includes a luminescent material-containing element similar to that from the third embodiment (although the luminescent material-containing element of the lighting device 60 is of a shape that differs from the shape of the luminescent material-containing element in the lighting device 30). The blue light impinges the phosphor coating on the bottom conical surface. Blue light that is not converted either is reflected in a grazing reflection off the transparent heat sink and back into the phosphor layer, or is transmitted through the transparent heat sink. Yellow light is either emitted back into one or both of the reflectors 65 or 67 and bounced out through the diffuser 68, or is transmitted upward (in the orientation shown in FIG. 6) through the luminescent material-containing element 63. The blue and yellow light transmitted through the luminescent material-containing element 63 backlight the red (or red+blue) light emitting diodes 61, which are connected via a circuit which is replicated directly on the top horizontal surface of the luminescent material-containing element 63. All of the exiting light is directed through the diffuser 68, which obscures and color mixes the light.

In each of the lighting devices 10, 20, 30, 40, 50 and 60 described above, blue light emitting diodes (i.e., light emitting diodes that emit blue light) excite a remote phosphor to generate yellow light. By using blue solid state light emitters driving remote luminescent material, the proximity of the solid state light emitters to the emitting luminescent material is much less, allowing for a much smaller solid angle of emission to impinge the blue solid state light emitters and be reabsorbed.

In some embodiments in accordance with the present inventive subject matter, additional structures are introduced to further direct light away from the light emitting diodes and toward other optical structures for directing the light.

The remote luminescent material allows for a significantly more distributed source relative to a discrete device (e.g., in the embodiments above, a blue chip/phosphor yellow light emitting diode device), such that, e.g., comparatively small signal red light emitting diodes can be placed in close proximity to or directly on top of the remote phosphor substrate, allowing for lower diffusion angles and less optical loss from a color mixing diffuser.

These embodiments combine a remote phosphor layer with the inherent improved yellow extraction with small signal red light emitting diodes to provide more efficient overall systems.

By placing red emitters in the center of a ring of yellow or placing red emitters directly on top of the remote luminescent material-containing element, significantly less diffusion may be required to obscure the individual light emitting diodes. This leads to narrower light distributions with greater center "punch" and shallower mixing chamber depth, resulting in increased optical extraction efficiency, lower materials usage and a more compact and more universally installable fixture.

As noted above, the present inventive subject matter also provides embodiments in which any desired combinations of red light, green light and blue light are provided to produce white light. Accordingly, any of the embodiments described above can include emitters that emit red light, green light and blue light (and optionally additional colors) instead of the combinations of emitters that emit red light, yellowish-green light and blue light as described. For instance, in any of the embodiments described above, the blue solid state light emitters can be replaced with a mixture of blue solid state light emitters and green solid state light emitters, and/or the yellowish-green luminescent material can be replaced with green luminescent material; and/or the yellowish-green luminescent material can be replaced with red luminescent material and the red solid state light emitters can be replaced with green solid state light emitters, etc.

In some embodiments in accordance with the present inventive subject matter, at least 75% of the light emitted by the second solid state light emitter enters the luminescent material-containing element before reaching an emission plane of the first solid state light emitter.

The expression "emission plane of a solid state light emitter," (e.g., "an emission plane of the first solid state light emitter"), as used herein, means (1) a plane that is perpendicular to an axis of the light emission from the solid state light emitter (e.g., in a case where light emission is hemispherical, the plane would be along the flat part of the hemisphere; in a case where light emission is conical, the plane would be perpendicular to the axis of the cone), (2) a plane that is perpendicular to a direction of maximum intensity of light emission from the solid state light emitter (e.g., in a case where the maximum light emission is vertical, the plane would be horizontal), (3) a plane that is perpendicular to a mean direction of light emission (in other words, if the maximum intensity is in a first direction, but an intensity in a second direction ten degrees to one side of the first direction is larger than an intensity in a third direction ten degrees to an opposite side of the first direction, the mean intensity would be moved somewhat toward the second direction as a result of the intensities in the second direction and the third direction). Accordingly, in the first embodiment, the emission plane of each of the solid state light emitters 11 is parallel to the top and bottom surfaces of the luminescent material-containing element 13.

The expression "light emitted by the first solid state light emitter," as used herein, (e.g., in the expression "at least 75% of the light emitted by the first solid state light emitter enters the luminescent material-containing element before reaching a plane that includes a point on an emission surface of the first solid state light emitter"), includes light that is emitted by the first solid state light emitter and has not been converted or has been converted by the luminescent material (i.e., absorbed by the luminescent material and re-emitted by the luminescent material) before reaching the emission plane of the first solid state light emitter.

The expression "enters the luminescent material-containing element before reaching an emission plane of the first solid state light emitter" (e.g., in the expression "at least 75% of the light emitted by the second solid state light emitter enters the luminescent material-containing element before reaching an emission plane of the first solid state light emitter") means that the light does not pass through the emission plane of the first solid state light emitter until after such light has already entered the luminescent material-containing element.

For example, in the first embodiment (and similarly in the second and third embodiments, and possibly, depending on the precise geometries, in the other depicted embodiments), at least 75% of the light emitted by each of the solid state light emitters in the second group of solid state light emitters 12 enters the luminescent material-containing element 13 before reaching an emission plane of any of the solid state light emitters in the first group of solid state light emitters 11 (such emission planes are shown as being above the bottom surface of the luminescent material-containing element 13).

In some embodiments in accordance with the present inventive subject matter, at least 90% of light exiting the lighting device that was emitted by the second group of solid state light emitters travels at least 25% farther within the lighting device than 90% of light exiting the lighting device that was emitted by the first group of solid state light emitters. For example, in the first embodiment described above (and similarly in the other depicted embodiments), more than 90% of light exiting the lighting device that was emitted by the second group of solid state light emitters 12 travels at least 25% farther within the lighting device than 90% of light exiting the lighting device that was emitted by the first group of solid state light emitters 11.

In some embodiments in accordance with the present inventive subject matter, at least 90% of light exiting the lighting device that was emitted by the second group of solid state light emitters travels, within a space defined by a housing and a diffuser of the lighting device, at least 25% farther than 90% of light exiting the lighting device that was emitted by the first group of solid state light emitters. For example, in FIG. 1, the space is defined by the diffuser 18, the expanding conic reflector 15 and the expanding conic reflector 17 (as well as the substrate 16).

In some embodiments in accordance with the present inventive subject matter, an average distance traveled by light exiting the lighting device that was emitted by the second group of solid state light emitters is at least 25% farther than an average distance traveled by light exiting the lighting device that was emitted by the first group of solid state light emitters.

In some embodiments in accordance with the present inventive subject matter, at least a portion of the luminescent material-containing element is substantially transparent, and at least 75% of the light emitted by the second group of solid state light emitters passes through the luminescent material-containing element and through the emission plane of the first solid state light emitter.

For example, in the first embodiment (and similarly in the second and third embodiments, and possibly, depending on the precise geometries, in the sixth embodiment), at least 75% of the light emitted by the second group of solid state light emitters 12 passes through the substantially transparent luminescent material-containing element 13 and through the emission plane of the solid state light emitters in the first group of solid state light emitters 11.

In some embodiments in accordance with the present inventive subject matter, the luminescent material-containing element is substantially parallel to the emission plane of the first solid state light emitter. For example, in the first embodiment described above (and similarly in the second and third embodiments), the luminescent material-containing element 13 is substantially parallel to the emission plane of each of the solid state light emitters in the first group of solid state light emitters 11.

In some embodiments in accordance with the present inventive subject matter, the emission plane of the first solid state light emitter extends through at least a portion of the luminescent material-containing element. For example, if the first embodiment were modified such that at least one of the solid state light emitters in the first group of solid state light emitters 11 was positioned slightly lower, such that its emission plane extended through the luminescent material-containing element 13, this feature could be exhibited.

In some embodiments in accordance with the present inventive subject matter, the luminescent material-containing element is adjacent to a first support element on which the first solid state light emitter is mounted. For example, in the first embodiment (and similarly in the second embodiment) described above, the luminescent material-containing element 13 is adjacent to a support element (i.e., the substrate 16) on which each of the solid state light emitters in the first group of solid state light emitters 11 is mounted.

In some embodiments in accordance with the present inventive subject matter, light emitted by the second solid state light emitter is surrounded by light emitted by the first group of solid state light emitters. The term "surrounded", as used herein, e.g., in the expression "light emitted by the second solid state light emitter is surrounded by light emitted by the first group of solid state light emitters" means that (1) an axis of symmetry of the light emission from the second solid state light emitter, or (2) an axis that is co-linear with a direction of maximum intensity of light emission from the second solid state light emitter, and/or (3) an axis that is co-linear with a mean direction of light emission from the second solid state light emitter, passes through at least one area having a perimeter defined by line segments connecting respective pairs of solid state light emitters contained in the first group of solid state light emitters. In some embodiments, in addition, (1) the solid state light emitters contained in the first group of solid state light emitters are substantially co-planar, i.e., there exists a plane from which no solid state light emitter in the first group is spaced by more than 25% (and in some cases by not more than 10%) of the distance between that solid state light emitter and another solid state light emitter in the first group, and/or (2) respective rays of symmetry of light emission from the first solid state light emitters, respective directions of maximum intensity of light emission from the first solid state light emitters, and/or respective mean directions of light emission from the first solid state light emitters differ from (a) a ray of symmetry of the light emission from the second solid state light emitter, (b) a direction of maximum intensity of light emission from the second solid state light emitter, and/or (c) a mean direction of light emission from the second solid state light emitter by not more than 30 degrees (and in some cases by not more than 10 degrees).

For example, in the first embodiment described above, light emitted by the second group of solid state light emitters 12 is surrounded by light emitted by the first group of solid state light emitters 11, i.e., line segments connecting solid state light emitters in the first group of solid state light emitters 11 that extend around the luminescent material-containing element 13 (e.g., that form a triangle that extends around the luminescent material-containing element 13, or a regular or irregular four-sided shape, five-sided shape, six-sided shape, etc. that extends around the luminescent material-containing element 13) would together define an area (1) through which axes of symmetry of the light emission from each of the solid state light emitters in the second group of solid state light emitters 12 pass, (2) through which axes that are co-linear with directions of maximum intensity of light emission from each of the solid state light emitters in the second group of solid state light emitters 12 pass, and (3) through which axes that are co-linear with mean directions of light emission from each of the solid state light emitters in the second group of solid state light emitters 12 pass. In addition, in the first embodiment described above, the solid state light emitters contained in the first group of solid state light emitters 11 are substantially co-planar. In addition, in the first embodiment described above, respective rays of symmetry of light emission from the first solid state light emitters 11, respective directions of maximum intensity of light emission from the first solid state light emitters 11, and respective mean directions of light emission from the first solid state light emitters 11 differ from (a) respective rays of symmetry of the light emission from the second solid state light emitters 12, (b) respective directions of maximum intensity of light emission from the second solid state light emitters 12, and (c) respective mean directions of light emission from the second solid state light emitters 12 by not more than 10 degrees.

In the second embodiment described below (see FIG. 2), light emitted by the first group of solid state light emitters 21 is surrounded by light emitted by the second group of solid state light emitters 22, i.e., line segments connecting solid state light emitters in the second group of solid state light emitters 22 extend around a space directly beneath (in the orientation depicted in FIG. 2) the substrate 26 and of the same dimensions and orientation as the substrate 26 (e.g., that form a triangle that extends around a space directly beneath the substrate 26 of the same dimensions and orientation as the substrate 26, or a regular or irregular four-sided shape, five-sided shape, six-sided shape, etc. that extends around a space directly beneath the substrate 26 of the same dimensions and orientation as the substrate 26) would together define an area (1) through which axes of symmetry of the light emission from each of the solid state light emitters in the first group of solid state light emitters 21 pass (because the axes, by definition, extend upward, in the orientation shown in FIG. 2, in the direction light flow, as well as downward), (2) through which axes that are co-linear with directions of maximum intensity of light emission from each of the solid state light emitters in the first group of solid state light emitters 21 pass (again, because axes, by definition, extend both in the direction that light travels and in the opposite direction), and (3) through which axes that are co-linear with mean directions of light emission from each of the solid state light emitters in the first group of solid state light emitters 21 pass. In addition, in the second embodiment described below, the solid state light emitters contained in the second group of solid state light emitters 22 are substantially co-planar. In addition, in the second embodiment described above, respective rays of symmetry of light emission from the second solid state light emitters 22, respective directions of maximum intensity of light emission from the second solid state light emitters 22, and respective mean directions of light emission from the second solid state light emitters 22 differ from (a) respective rays of symmetry of the light emission from the first solid state light emitters 21, (b) respective directions of maximum intensity of light emission from the first solid state light emitters 21, and (c) respective mean directions of light emission from the first solid state light emitters 21 by not more than 10 degrees.

In some embodiments in accordance with the present inventive subject matter, the first group of solid state light emitters comprises a plurality of solid state light emitters which each have respective emission planes that are substantially parallel to the emission plane of the first solid state light emitter. For example, in the first embodiment (and similarly in the other embodiments) described above, the respective emission planes of each solid state light emitter in the first group of solid state light emitters 11 are co-planar. The expression "substantially parallel", as used herein, encompasses co-planar.

In some embodiments in accordance with the present inventive subject matter, the first solid state light emitter is mounted on a first support element that defines a first support element opening in which the luminescent material-containing element is positioned. For example, in the first embodiment, each of the solid state light emitters in the first group of solid state light emitters 11 is mounted on an annular first support element (the substrate 16) that defines an opening in which the luminescent material-containing element 13 is positioned. In some embodiments (including the first embodiment described herein), substantially all of the light exiting the lighting device that was emitted by the second group of solid state light emitters passes through the luminescent material-containing element and through the first support element opening. In some embodiments, (including the first embodiment described herein), substantially all of the light exiting the lighting device that was emitted by the second group of solid state light emitters passes simultaneously through the luminescent material-containing element and through the first support element opening.

In some embodiments in accordance with the present inventive subject matter, the first solid state light emitter is mounted on a first support element, and the luminescent material-containing element defines a luminescent material-containing element opening in which the first support element is positioned. For example, in the second embodiment described above, each of the solid state light emitters in the first group of solid state light emitters 21 is mounted on a first support element (the substrate 26), and the annular luminescent material-containing element 23 defines a luminescent material-containing element opening in which the first support element 26 is positioned.

In some embodiments in accordance with the present inventive subject matter, the first solid state light emitter is mounted on the luminescent material-containing element. For example, in the first embodiment (and similarly in the second, third and sixth embodiments) described above, each of the solid state light emitters in the first group of solid state light emitters 11 is mounted on the luminescent material-containing element 13.

In some embodiments in accordance with the present inventive subject matter, substantially all light exiting the lighting device that was emitted by the second group of solid state light emitters enters the luminescent material-containing element, and at least 50% of light exiting the lighting device that was emitted by the first group of solid state light emitters does not enter the luminescent material-containing element. For example, in the first embodiment (and similarly in the second, third, fourth and sixth embodiments, and possibly, depending on the precise geometries, in the fifth embodiment), substantially all light exiting the lighting device that was emitted by the second group of solid state light emitters 12 enters the luminescent material-containing element 13, and at least 50% of light exiting the lighting device that was emitted by the first group of solid state light emitters 11 does not enter the luminescent material-containing element 13.

In some embodiments in accordance with the present inventive subject matter, at least a portion of the luminescent material-containing element is positioned between the first group of solid state light emitters and the second group of solid state light emitters. For example, in the fourth embodiment (and similarly in the third and sixth embodiments), a portion of the luminescent material-containing element 43 is positioned between the first group of solid state light emitters 41 and the second group of solid state light emitters 42.

The present inventive subject matter further relates to methods comprising illuminating the first and second first groups of solid state light emitters in any of the lighting devices described herein.

The present inventive subject matter further relates to a method comprising:

illuminating a first group of solid state light emitters comprising at least a first solid state light emitter;

illuminating a second group of solid state light emitters comprising at least a second solid state light emitter, the second group of solid state light emitters being spaced from a luminescent material-containing element that comprises at least one luminescent material, at least 75% of the light emitted by the second solid state light emitter entering the luminescent material-containing element before reaching an emission plane of the first solid state light emitter.

The present inventive subject matter further relates to a method comprising:

illuminating a first group of solid state light emitters comprising at least a first solid state light emitter;

illuminating a second group of solid state light emitters comprising at least a second solid state light emitter, the second group of solid state light emitters being spaced from a luminescent material-containing element that comprises at least one luminescent material, at least 90% of the light exiting the lighting device that was emitted by the second group of solid state light emitters travelling at least 25% farther within the lighting device than 90% of light exiting the lighting device that was emitted by the first group of solid state light emitters.

The present inventive subject matter further relates to a method comprising:

illuminating a first group of solid state light emitters comprising at least a first solid state light emitter;

illuminating a second group of solid state light emitters comprising at least a second solid state light emitter, the second group of solid state light emitters being spaced from a luminescent material-containing element that comprises at least one luminescent material, an average distance traveled by light exiting the lighting device that was emitted by the second group of solid state light emitters being at least 25% farther than an average distance traveled by light exiting the lighting device that was emitted by the second group of solid state light emitters.

The lighting devices of the present inventive subject matter can be supplied with electricity in any desired manner. Skilled artisans are familiar with a wide variety of power supplying apparatuses, and any such apparatuses can be employed in connection with the present inventive subject matter. The lighting devices of the present inventive subject matter can be electrically connected (or selectively connected) to any desired power source, persons of skill in the art being familiar with a variety of such power sources.

Representative examples of apparatuses for supplying electricity to lighting devices and power supplies for lighting devices, all of which are suitable for the lighting devices of the present inventive subject matter, are described in:

U.S. patent application Ser. No. 11/626,483, filed Jan. 24, 2007 (now U.S. Patent Publication No. 2007/0171145), the entirety of which is hereby incorporated by reference as if set forth in its entirety;

U.S. patent application Ser. No. 11/755,162, filed May 30, 2007 (now U.S. Patent Publication No. 2007/0279440), the entirety of which is hereby incorporated by reference as if set forth in its entirety;

U.S. patent application Ser. No. 11/854,744, filed Sep. 13, 2007 (now U.S. Patent Publication No. 2008/0088248), the entirety of which is hereby incorporated by reference as if set forth in its entirety;

U.S. patent application Ser. No. 12/117,280, filed May 8, 2008 (now U.S. Patent Publication No. 2008/0309255), the entirety of which is hereby incorporated by reference as if set forth in its entirety; and U.S. patent application Ser. No. 12/328,144, filed Dec. 4, 2008 (now U.S. Patent Publication No. 2009/0184666), the entirety of which is hereby incorporated by reference as if set forth in its entirety.

The lighting devices according to the present inventive subject matter can further comprise any desired electrical connector, a wide variety of which are familiar to those of skill in the art, e.g., an Edison connector (for insertion in an Edison socket), a GU-24 connector, etc.

In some embodiments according to the present inventive subject matter, the lighting device is a self-ballasted device. For example, in some embodiments, the lighting device can be directly connected to AC current (e.g., by being plugged into a wall receptacle, by being screwed into an Edison socket, by being hard-wired into a circuit, etc.). Representative examples of self-ballasted devices are described in U.S. patent application Ser. No. 11/947,392, filed on Nov. 29, 2007 (now U.S. Patent Publication No. 2008/0130298), the entirety of which is hereby incorporated by reference as if set forth in its entirety.

While certain embodiments of the present inventive subject matter have been illustrated with reference to specific combinations of elements, various other combinations may also be provided without departing from the teachings of the present inventive subject matter. Thus, the present inventive subject matter should not be construed as being limited to the particular exemplary embodiments described herein and illustrated in the Figures, but may also encompass combinations of elements of the various illustrated embodiments.

Many alterations and modifications may be made by those having ordinary skill in the art, given the benefit of the present disclosure, without departing from the spirit and scope of the inventive subject matter. Therefore, it must be understood that the illustrated embodiments have been set forth only for the purposes of example, and that it should not be taken as limiting the inventive subject matter as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the inventive subject matter.

Any two or more structural parts of the lighting devices described herein can be integrated. Any structural part of the lighting devices described herein can be provided in two or more parts which are held together, if necessary. Similarly, any two or more functions can be conducted simultaneously, and/or any function can be conducted in a series of steps.

The invention claimed is:

1. A lighting device comprising:
a first group of solid state light emitters comprising at least a first solid state light emitter;
a luminescent material-containing element comprising at least one luminescent material; and
a support element that defines a support element opening, the support element opening extending entirely through the support element,
the first group of solid state light emitters is on the support element, and
the luminescent material-containing element is in the support element opening and allows at least some light to pass entirely through the support element opening.

2. A lighting device as recited in claim 1, wherein:
the lighting device further comprises a second group of solid state light emitters comprising at least a second solid state light emitter, and
light emitted by the second group of solid state light emitters is surrounded by light emitted by the first group of solid state light emitters.

3. A lighting device as recited in claim 1, wherein:
the lighting device further comprises a second group of solid state light emitters comprising at least a second solid state light emitter,
the second solid state light emitter is in a space defined by at least one or more reflective surfaces and the luminescent material-containing element, and
the first solid state light emitter is outside the space.

4. A lighting device as recited in claim 1, wherein:
the lighting device further comprises a second group of solid state light emitters comprising at least a second solid state light emitter, and
at least 75% of the light emitted by the second solid state light emitter enters the luminescent material-containing element before reaching an emission plane of the first solid state light emitter.

5. A lighting device as recited in claim 1, wherein:
the lighting device further comprises a second group of solid state light emitters comprising at least a second solid state light emitter,
an emission plane of the first solid state light emitter is substantially parallel to an emission plane of the second solid state light emitter.

6. A lighting device as recited in claim 1, wherein:
the lighting device further comprises a second group of solid state light emitters comprising at least a second solid state light emitter, substantially all of the light exiting the lighting device that was emitted by the second group of solid state light emitters passes through the luminescent material-containing element and through the support element opening.

7. A lighting device as recited in claim 1, wherein a surface of the support element and a surface of the luminescent material-containing element are substantially coplanar.

8. A lighting device comprising:
a luminescent material-containing element that comprises at least one luminescent material and that defines a first opening;
a support element; and
a first group of solid state light emitters comprising at least a first solid state light emitter, the first group of solid state light emitters on the support element,
the support element in the first opening,
a plane extending through the first solid state light emitter not extending through the luminescent material-containing element.

9. A lighting device as recited in claim 8, wherein:
the lighting device further comprises a second group of solid state light emitters comprising at least a second solid state light emitter, and
light emitted by the first group of solid state light emitters is surrounded by light emitted by the second group of solid state light emitters.

10. A lighting device as recited in claim 8, wherein:
the lighting device further comprises a second group of solid state light emitters comprising at least a second solid state light emitter,
the second solid state light emitter is in a space defined by at least one or more reflective surfaces and the luminescent material-containing element, and
the first solid state light emitter is outside the space.

11. A lighting device as recited in claim 8, wherein:
the lighting device further comprises a second group of solid state light emitters comprising at least a second solid state light emitter, and
at least 75% of the light emitted by the second solid state light emitter enters the luminescent material-containing element before reaching an emission plane of the first solid state light emitter.

12. A lighting device as recited in claim 8, wherein:
the lighting device further comprises a second group of solid state light emitters comprising at least a second solid state light emitter,
an emission plane of the first solid state light emitter is substantially parallel to an emission plane of the second solid state light emitter.

13. A lighting device as recited in claim 8, wherein:
the lighting device further comprises a second group of solid state light emitters comprising at least a second solid state light emitter,
substantially all of the light exiting the lighting device that was emitted by the second group of solid state light emitters passes through the luminescent material-containing element.

14. A lighting device as recited in claim 8, wherein a surface of the support element and a surface of the luminescent material-containing element are substantially coplanar.

15. A lighting device comprising:
a first group of solid state light emitters comprising at least a first solid state light emitter; and
a luminescent material-containing element comprising at least one luminescent material,
the first solid state light emitter on the luminescent material-containing element, a plane extending through the first solid state light emitter not extending through the luminescent material-containing element.

16. A lighting device as recited in claim 15, wherein the first group of solid state light emitters is on the support element.

17. A lighting device as recited in claim 15, wherein:
the lighting device further comprises a second group of solid state light emitters comprising at least a second solid state light emitter, and
light emitted by the second group of solid state light emitters is surrounded by light emitted by the first group of solid state light emitters.

18. A lighting device as recited in claim 15, wherein:
the lighting device further comprises a second group of solid state light emitters comprising at least a second solid state light emitter, and
light emitted by the first group of solid state light emitters is surrounded by light emitted by the second group of solid state light emitters.

19. A lighting device as recited in claim 15, wherein:
the lighting device further comprises a second group of solid state light emitters comprising at least a second solid state light emitter,
the second solid state light emitter is in a space defined by at least one or more reflective surfaces and the luminescent material-containing element, and
the first solid state light emitter is outside the space.

20. A lighting device as recited in claim 15, wherein:
the lighting device further comprises a second group of solid state light emitters comprising at least a second solid state light emitter, and
at least a portion of the luminescent material-containing element is between the first solid state light emitter and the second solid state light emitter.

21. A lighting device comprising:
at least a first luminescent material-containing element that comprises at least one luminescent material;
a first group of solid state light emitters comprising at least a first solid state light emitter;
a second group of solid state light emitters comprising at least a second solid state light emitter;
at least a first reflective surface,
the second solid state light emitter in a space defined by the at least one reflective surface and the first luminescent material-containing element,
the first solid state light emitter is outside the space,
the first luminescent material-containing element outside the space, and at least some light emitted by the first solid state light emitter exits the lighting device without passing through the first luminescent material-containing element.

* * * * *

UNITED STATES PATENT AND TRADEMARK OFFICE
CERTIFICATE OF CORRECTION

PATENT NO. : 9,493,107 B2  
APPLICATION NO. : 13/672941  
DATED : November 15, 2016  
INVENTOR(S) : Paul Kenneth Pickard Page 1 of 1

It is certified that error appears in the above-identified patent and that said Letters Patent is hereby corrected as shown below:

On the Title Page

Other Publications, Page 2, Right Column:
Please change: "High Efficiency, Nitride-Based, Solid-State Lighting, Summary of UCSB Research, Summary of LRC Research, www.lre.rpi.edu/programs/solidstate/cr_nitridebasedssl.asp, pp. 1-2." to
-- High Efficiency, Nitride-Based, Solid-State Lighting, Summary of UCSB Research, Summary of LRC Research, www.lrc.rpi.edu/programs/solidstate/cr_nitridebasedssl.asp, pp. 1-2. --

Signed and Sealed this  
Twenty-fifth Day of April, 2017

Michelle K. Lee  
*Director of the United States Patent and Trademark Office*